United States Patent [19]
Lin et al.

[11] Patent Number: 5,490,036
[45] Date of Patent: Feb. 6, 1996

[54] PORTABLE COMPUTER WITH TILTABLE KEYBOARD STRUCTURE HAVING RELEASABLY ENGAGEABLE LATCH ASSEMBLY MEMBERS EXTENDING THEREFROM

[75] Inventors: Jeng-Hua Lin; John P. Busch; James W. Huffman, all of Austin, Tex.

[73] Assignee: Dell USA, L.P., Austin, Tex.

[21] Appl. No.: 183,018

[22] Filed: Jan. 18, 1994

[51] Int. Cl.$^6$ ................................. G06F 1/16; H05K 5/02
[52] U.S. Cl. ............................................. 361/680; 400/682
[58] Field of Search ......................... 364/708.1; 361/680; 312/223.2; 400/472, 479, 682, 691, 693

[56] References Cited

U.S. PATENT DOCUMENTS 5,153,589   10/1992   Heys, Jr. et al. ................... 361/680 X

OTHER PUBLICATIONS

IBM Technical Disclosure Bulletin, vol. 29, No. 8, pp. 3491 and 3492, Jan., 1987, "Access Method For Feature Expansion.".

Primary Examiner—Michael W. Phillips
Attorney, Agent, or Firm—Charles Gaines; James Huffman

[57] ABSTRACT

A keyboard structure is recessed within an open-topped base housing portion of a compact portable computer such as a notebook or laptop computer. Front corner portions of the keyboard structure are secured to the base housing in a manner permitting the keyboard structure to be pivoted relative to the base housing between a storage/transport orientation in which the top side of the keyboard structure is generally parallel to the bottom side of the base housing, a tilted use orientation in which the top side of the keyboard structure slopes forwardly and downwardly toward the user and an access position which allows easy access to the interior portion of the computer for making modifications to a mother board that has been positioned in the upper interior portion of the base housing. A resilient latch assembly has cooperable detent structures that are disposed on the keyboard structure and the base housing. The detent structures are easily detachable from themselves and also functions to prevent the keyboard structure from moving downwardly past the storage/transport position.

12 Claims, 6 Drawing Sheets

PORTABLE COMPUTER WITH TILTABLE KEYBOARD STRUCTURE HAVING RELEASABLY ENGAGEABLE LATCH ASSEMBLY MEMBERS EXTENDING THEREFROM

BACKGROUND OF THE INVENTION

The present invention relates generally to keyboard portions of compact portable computers such as laptop and notebook computers, and more particularly relates to a titltable keyboard structure for portable computers.

Desktop computers are typically designed with detached input/output devices such as monitors, keyboards, mice, trackballs, etc. which allow a user to configure the position of the I/O devices in a manner that is most comfortable or ergonomically convenient. For example, full size keyboards are typically attached to a desktop computer via a long keyboard cable. The cable allows a user to position the keyboard on the edge of a desk, in his/her lap, or in any other position that is desired, as long as the cable is still attached. In addition, most full sized keyboards provide tiltable feet on their underneath side to allow a user to tilt the keyboard upwardly from the rear. This positions each rearwardly successive key row at a slightly higher elevation than that of the preceding key row to thereby ergonomically improve user hand and wrist orientations during keyboard use.

In contrast to the ergonomic advantages of desktop I/O devices, notebook computers are typically designed with the I/O devices physically and electrically attached within the casing of the computer. For example, the monitor or screen of a notebook computer is encased within the lid of the notebook computer, and swings upward from the base via a hinged connector. Mice are replaced with trackballs or other pointing devices which are mounted within the base of the computer, or next to the screen. Keyboards are rigidly mounted with the base of the notebook computer. It is recognized that the tiltable feature of desktop keyboards is desired in notebook computing. To acheive this ergonomic advantage, however, notebook computers provide titltable feet on the rear base of the computer. Thus, when a user desires to type on the keyboard of the notebook, the tiltable feet are swung out from underneath the base thereby tilting the keyboard towards the user. Such an arrangement provides an ergonomic typing angle if the notebook computer is placed on a hard flat surface. However, in many environments in which portable computers are used, such a hard flat surface is unavailable. Rather, users of portable computers often find themselves entering data with the computer placed on airplane trays, file folders, pillows, on their own knees, etc. In these situations, tiltable feet on the base of the notebook computer do not have an appropriate surface on which to rest. Therefore, users are required to type onto a keyboard that is essentially flat. What is needed is a mechanism which allows a user to adjust the tilt angle of the keyboard in a notebook computer in environments which do not provide hard flat surfaces on which the computer can rest.

In addition to the problems with notebook computers which are discussed above, another disadvantage in placing all I/O devices, as well as a central processing unit, memory, floppy drives, hard drives, Personal Computer Memory Card Interface Association (PCMCIA) cards, etc., within a single housing is that the housing of the notebook computer needs to provide access to all of these parts, as needed. For example, if a notebook computer is designed to allow a user to upgrade memory, an access door is provided on the underneath side of the base for example. If the CPU can be upgraded, an access door may be provided for it as well. Additionally, other access doors may be provided to allow for insertion/removal of PCMCIA cards, removable hard drives, modems, or other system enhancements. However, by adding a plurality of access doors within a portable computer, the structural integrity of notebook housing may be compromised. What is needed is a structure which allows access to components within the housing of a portable computer, but which does not dramatically compromise the housing's structural integrity.

It can be seen form the foregoing that it would be desirable to provide an improved portable computer with a simple, light weight and cost effective tiltable keyboard mechanism that eliminates or at least substantially reduces the above mentioned problems commonly associated with adjustably tiltable keyboard structures. It would also be desirable to provide an access door within the housing of a portable computer which does not compromise the structural integrity of the housing. It is accordingly an object of the present invention to provide such an improved portable computer.

SUMMARY OF THE INVENTION

In a preferred embodiment thereof, the present invention provides a compact portable computer, such as a laptop or notebook computer, comprising a base housing and a lid housing secured along a rear side of the base housing for pivotal motion relative thereto between open and closed positions. In its closed position the lid housing extends across and covers the top side of the base housing in a manner such that the computer is externally configured in a characteristic thin rectangular storage and transport orientation. When the computer is to be used, the bottom side of the base housing is placed on top a suitable horizontal support surface, and the lid housing is pivoted upwardly and rearwardly to its open position.

The pivotal opening of the lid housing exposes to a user a monitor screen extending along the front side of the lid housing, and also exposes a keyboard structure supported within the base housing and having a top side extending across the open top side of the base housing in an essentially parallel relationship with the bottom side of the base housing. According to a feature of the present invention, the keyboard structure may then be moved relative to the base housing from this initial storage/transport orientation to, and releasably locked in, a tilted use orientation in which the top side of the keyboard structure slopes forwardly and downwardly toward the user of the computer.

This desirable ability to improve the typing position of the keyboard structure is preferably achieved by securing the front side of the keyboard structure to the base housing for upward and downward pivotal motion relative thereto about a horizontal axis parallel to its front side, and interconnecting a rear side portion of the keyboard structure with the base housing using specially designed, simple, light weight latch means. The front side connection of the keyboard structure permits it to be selectively pivoted between a storage/transport position, a tilted use position and an access position which allows access to the interior of the computer housing through an access opening positioned on top of the base housing. The latch means are operative to releasably lock the keyboard structure in either the storage/transport position or the tilted use position and, as desired, may be configured to releasably lock the keyboard structure in more than one tilted use position. Additionally, the latch means are releasable to allow the keyboard to be pivoted to its access position.

According to one embodiment of the present invention, the latch means comprise generally planar overlapping portions, with cooperating detent-type structures, that depend from the side walls of the keyboard structure and that extend upwardly from the side walls of the base housing. Preferably, the latch means are positioned on both side walls of the keyboard structure and the base housing. The detent structures may be cooperating detent projections and depressions or may be some other similar design which allows the latch means to have cooperating interlocking means.

In another aspect of the present invention, the latch means also serve as stop means for preventing the keyboard from being pivoted below its storage/transportation position. In yet another aspect of the present invention, the computer has an access opening in the top of the base housing of the computer. In addition, the computer motherboard is positioned in an upper portion of the base housing to which access can be achieved through the access opening when the keyboard structure is in the access position. The access opening allows easy access to the computer's interior for inspection, repair and upgrade purposes.

DETAILED DESCRIPTION

Referring initially to FIGS. 1, 1A, 2, and 4, in a preferred embodiment thereof, the present invention incorporates a uniquely positionable keyboard structure 10 in a compact portable computer such as the representatively illustrated laptop or notebook computer 12. The keyboard structure 10 has a front side portion 14; a top key side portion 16 with an interior side 18 (see FIG. 1A); and oppositely positioned left and right side walls 20 and 22 (FIG. 4) depending from the top key side portion 16. The computer 12 includes an open-topped, relatively thin rectangular base housing 24 formed from a molded plastic material. The base housing 24 has a bottom wall 26 adapted to rest upon a suitable horizontal support surface 28; a front wall 30, left and right side walls 32, 34 (see FIG. 4) extending rearwardly from the opposite ends of front wall 30; a rear side portion 36; and an upstanding rear wall 38 extending parallel to the front wall 30.

A relatively thin rectangular plastic lid housing 40 is conventionally secured to the rear side portion 38 of the base housing 36 in a manner permitting the lid housing 40 to be pivoted between its illustrated upright use position (see FIGS. 1 and 2) and a lowered storage/transport position (not shown) in which the lid housing 40 extends across and covers a top side of the base housing 24. The lid housing 40 carries a monitor structure having a screen portion 42 extending across the front side of the lid housing 40 and visible to the computer user when the lid housing is in its upwardly pivoted use position.

Figure 1:
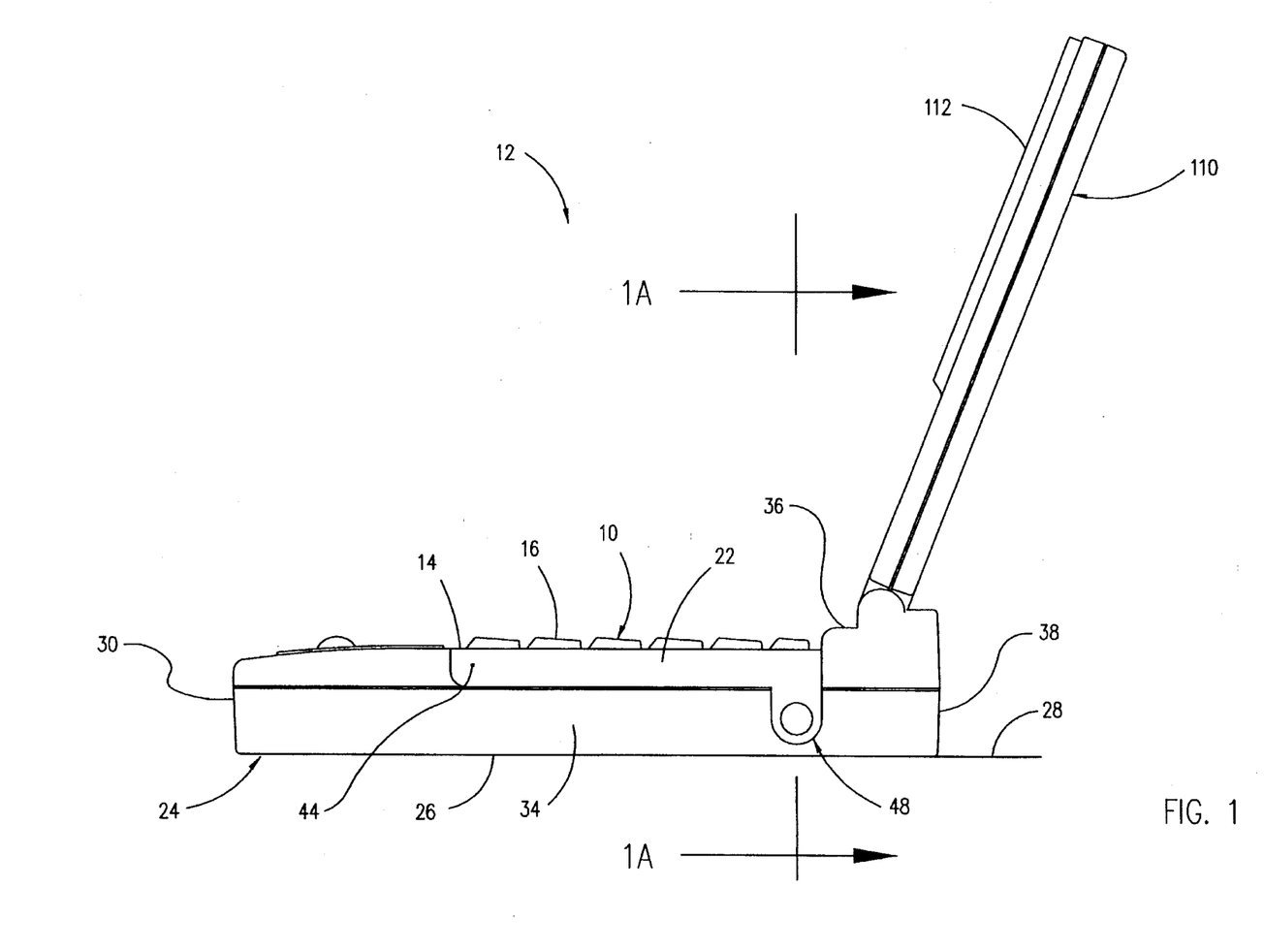
FIG. 1 is a simplified side elevational view of a representative portable computer with a keyboard structure, the computer being shown in an opened position with the keyboard in a releasably latched storage/transport and horizontal use position.

Referring now to FIG. 1, the keyboard structure 10 is supported on the top side of the base housing 24 in a manner subsequently described. When the lid housing 40 is initially raised to its upright use position, the now exposed keyboard structure 10 is in its storage/transport orientation in which the top key side 16 thereof extends across the top side of the base housing 24 and is essentially parallel to the bottom wall 26 of the base housing 24 and thus the horizontal surface 28 upon which it rests.

In compact portable computers of conventional construction, this horizontal orientation of the keyboard is the one that the computer user is limited to during typing thereon. This is in contrast to the more comfortable forwardly and downwardly sloping keyboard orientation available in separate desktop computer keyboard sections due to the incorporation therein of sloping housing udersides and/or downwardly pivotable rear support legs. However, in a unique manner that will be described herein, the keyboard structure 10 in the computer 12 may be tilted upwardly from its horizontal FIG. 1 position to the forwardly and downwardly sloping tilted use orientation shown in FIG. 2 in which the keyboard structure 10 is releasably locked to the base housing 24 and provides the computer user with considerably more comfortable typing hand and wrist positioning. It will be appreciated, of course, that the keyboard 10 may also be used in its horizontal orientation if so desired.

Figure 3:
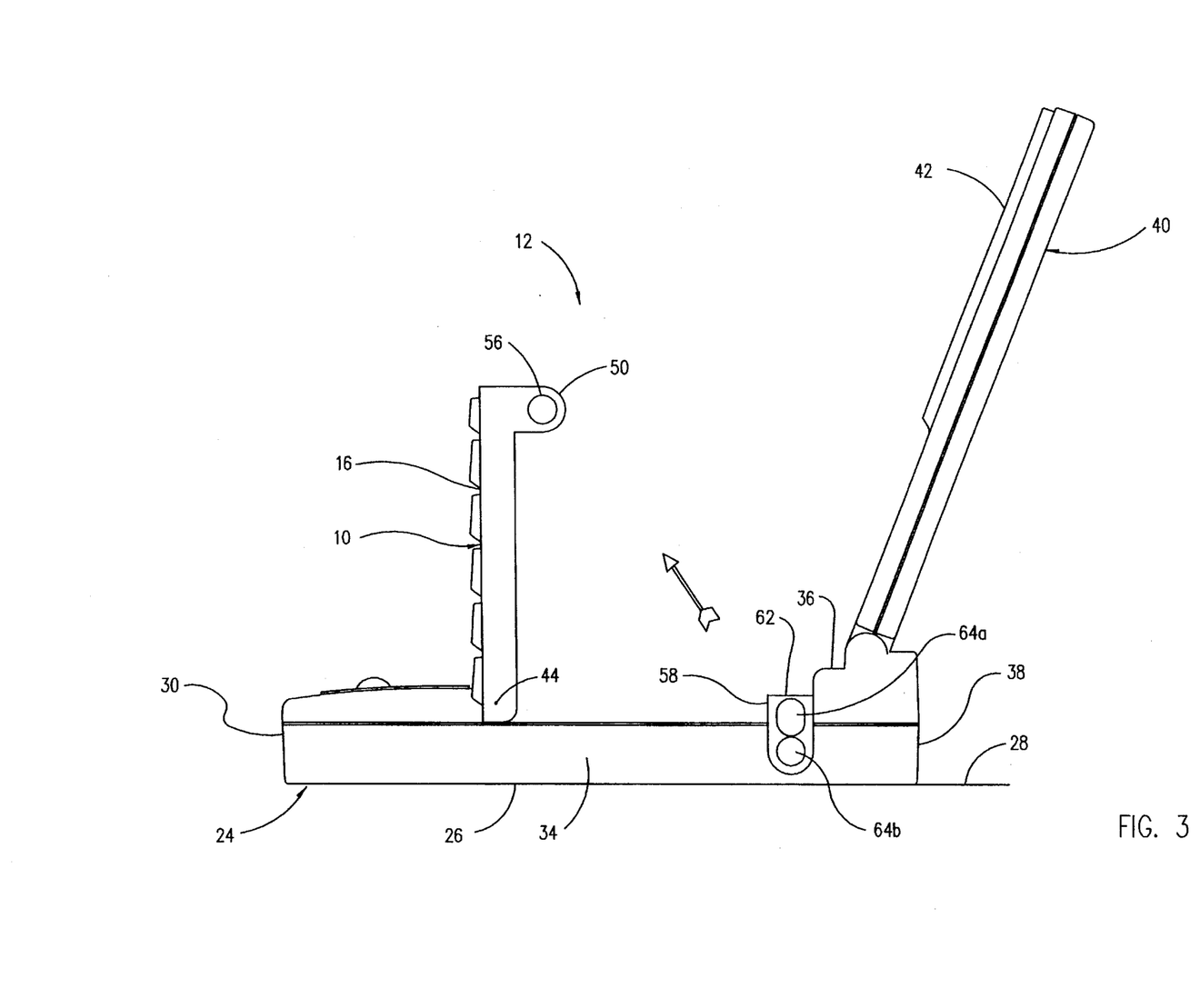
FIG. 3 is a side view of a representative portable computer which illustrates the keyboard structure in a perpendicular position to the computer housing that allows access to the interior of computer housing.
Figure 4:
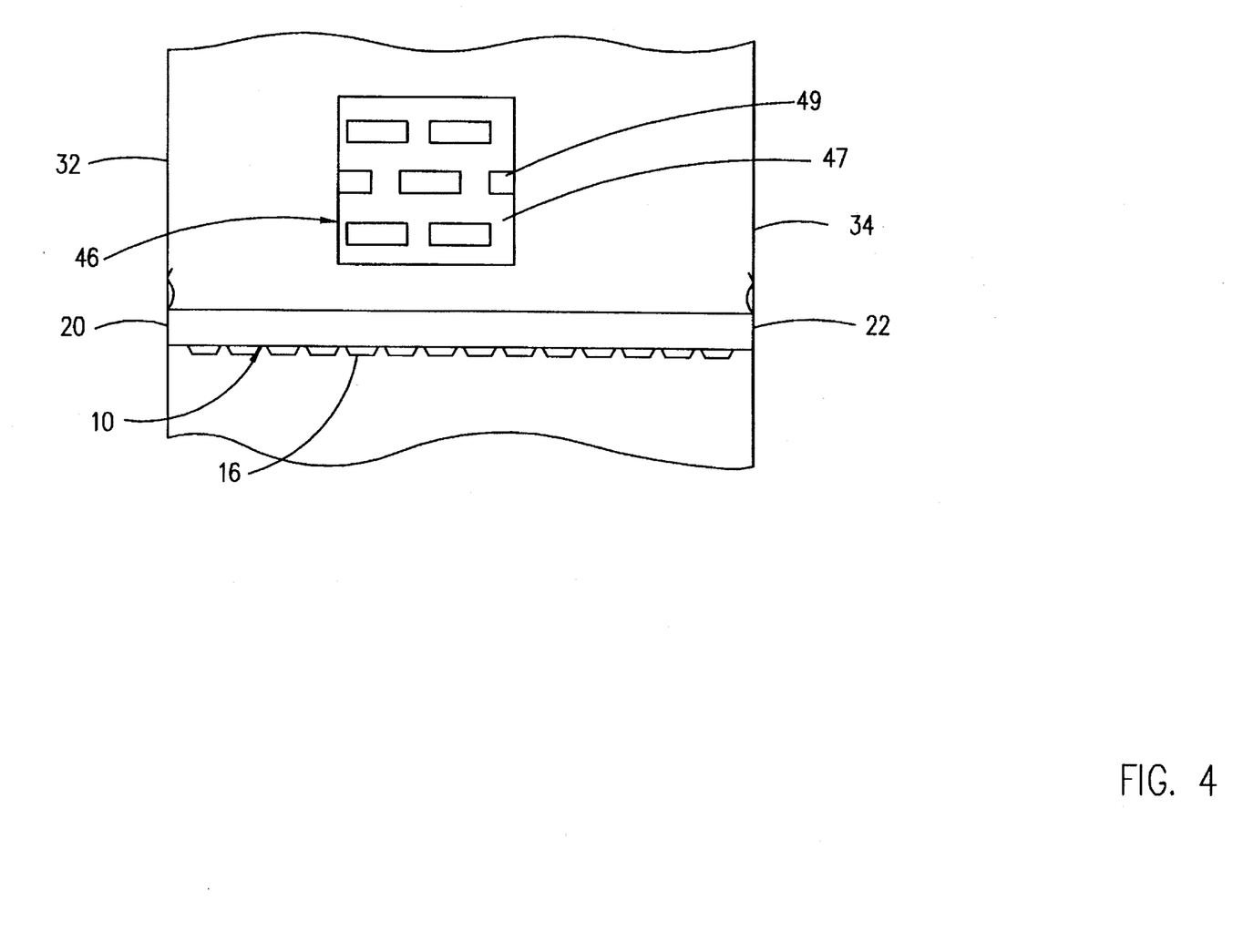
FIG. 4 is a partial top view of a representative portable computer which illustrates the keyboard structure in a transverse access position to the computer housing and shows a representative mother board within the interior of the computer housing.

With reference now to FIGS. 1, 3 and 4, as mentioned above, the keyboard structure 10 is mounted on the top side of base housing 24, between its front and rear walls 30 and 38. The front side 14 of the keyboard structure 10 is pivotally connected to the base housing 24 by a hinge 44 which allows the keyboard structure 10 to be pivoted to an access position as shown in FIG. 3. This position exposes the interior of the base housing 24 through an access opening 46. Through access opening 46, the user can gain access to motherboard 47 to replace or exchange components 49 or expand the memory if so desired. This unique feature of the present invention is particularly desirable when the motherboard is positioned in the upper portion of the interior of the base housing with the components facing upward toward the top of the computer. In such instances, where there is no access opening on the top of the computer as provided by the present invention or where the opening to the interior of the computer is positioned on the bottom side of the computer, accessibility to the component side of the motherboard can be achieved only by disassembling the unit.

Figure 1A:
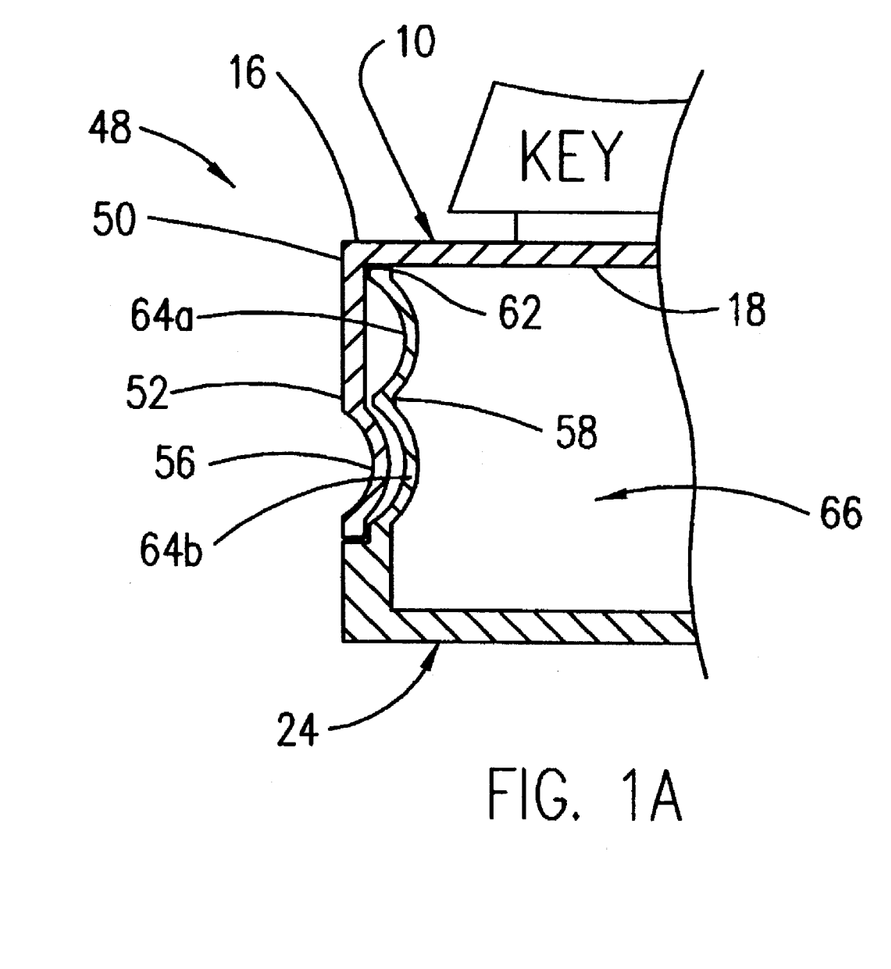
FIG. 1A is an enlarged scale partial cross-sectional view through the computer taken along the lines 1A—1A illustrating the position of the respective indents of the keyboard structure and computer housing comprising the latch assembly with the keyboard in the releasably latched storage/transport and horizontal use position.
Figure 2:
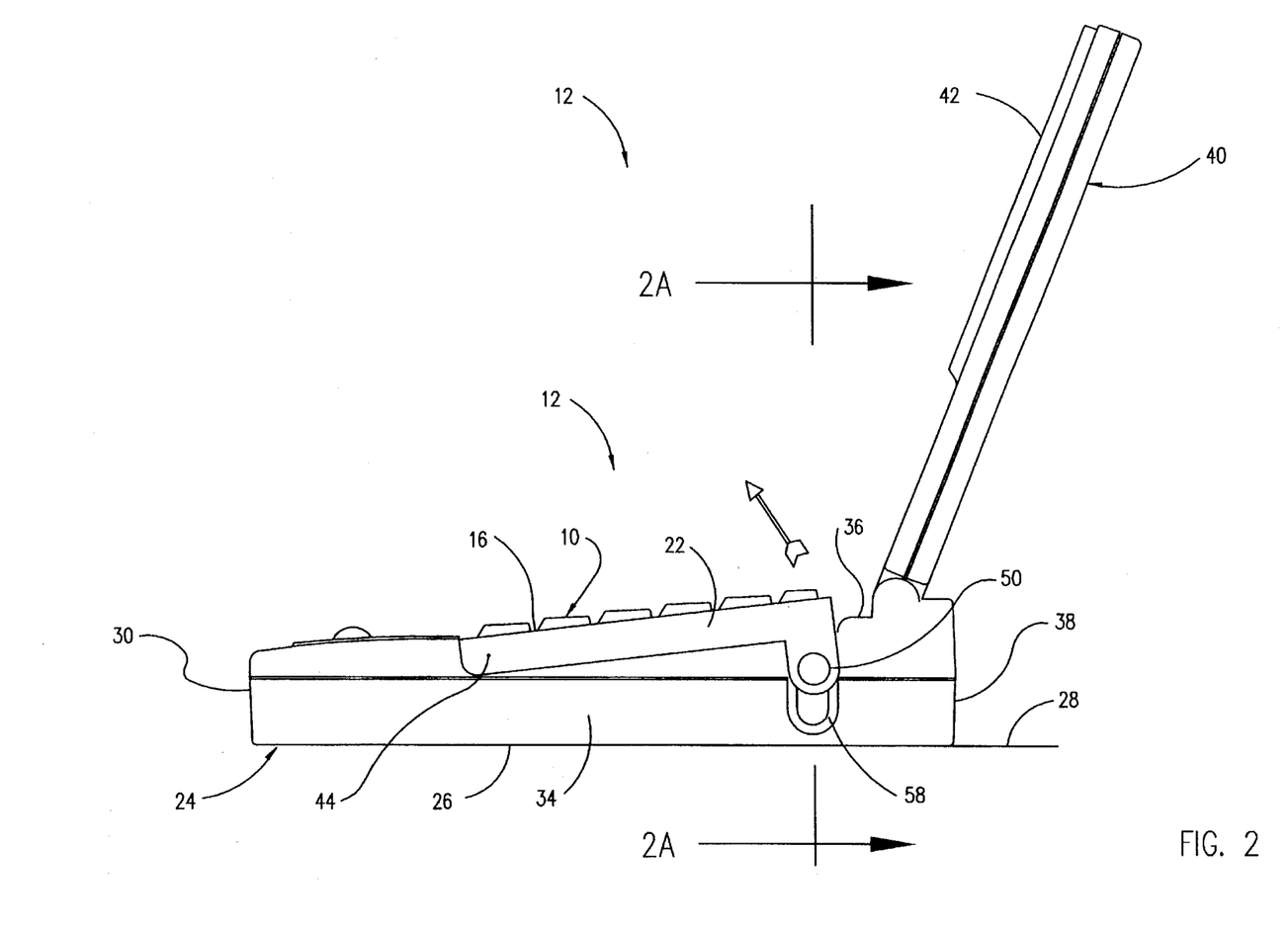
FIG. 2 is a side view of a representative portable computer with the keyboard structure in the preferred forwardly and downwardly sloped use position.
Figure 2A:
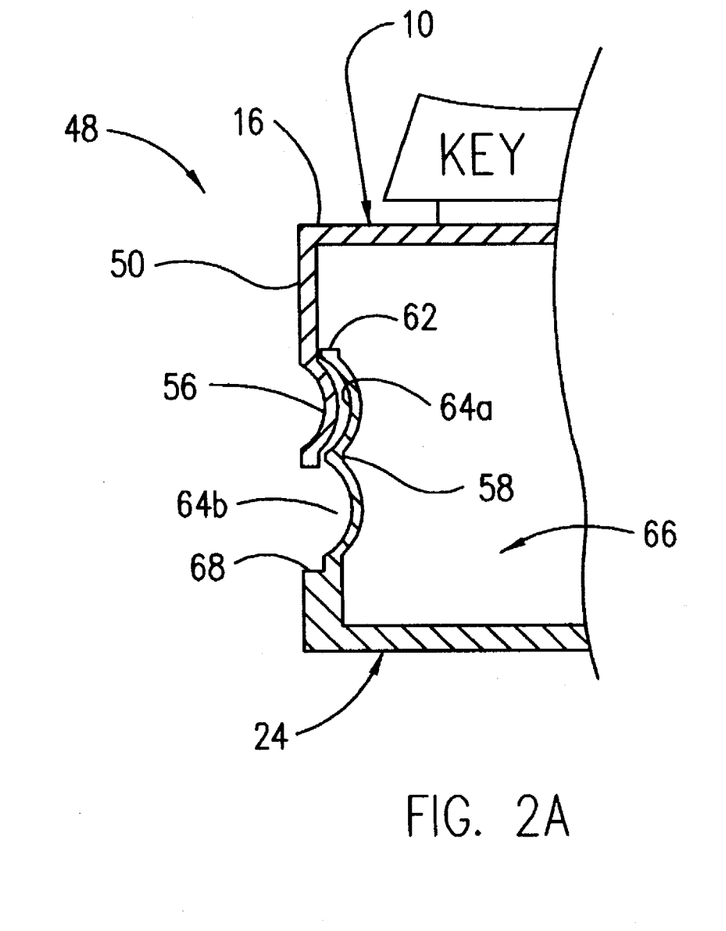
FIG. 2A is a cross-sectional view taken along the lines 2A—2A which illustrates the position of the respective indents of the keyboard structure and the computer housing comprising the latch structure with the keyboard in the preferred forwardly and downwardly sloped use position.

In addition, the present invention provides specially designed latch means which allow the keyboard to be tilted to a more desirable orientation. The latch means, which are discussed below, are not only light weight, but are extremely simple in design and cost effective. Thus, the advantages of having a tiltable keyboard are gained at little production cost and without the addition of any significant weight being added to the computer Referring now to FIGS. 1A and 2A, the computer of the present invention includes a simple latch assembly 48 for releasably holding the keyboard structure 10 in either the storage/transport position as shown in FIG. 1 or the tilted use position as shown in FIGS. 2A. Preferably, latch assembly 48 is resilient and includes a first generally planar wall portion 50 with a lower end portion 52 depending from at least one of the side walls 20, 22 of the keyboard structure 10, and a partially spherical inwardly projecting detent projection 56. The latch assembly 48 also includes a second planar wall portion 58 extending upwardly from at least one of the side walls 32, 34 of the base housing 24 and having an upper end 62. Upper and lower detent depressions 64a and 64b are formed on the outer side of the second planar wall 58 and lockingly receive the detent projection 56 to releasably hold the lid 40 in a selected one of its tilted use and storage/transport positions. Of course, it should be understood that while the illustrated preferred embodiment shows cooperating curved detent structures, it will be appreciated by those skilled in the art that the detent structures could be of varying designs which could function to releasably interlock the detent wall portions. Moreover, those skilled in the art will appreciate the fact that, if so desired, more than two detent depressions could be used to allow for varying degrees of keyboard slope.

The latch assembly 48 may also serve the dual purpose of a stop means for preventing the downward pivoting of the keyboard structure 10 past the storage/transport orientation. In a preferred embodiment stop means 66 is comprised of abutting portions of the keyboard structure 10 and the base housing 24. More specifically, the downward motion of the keyboard structure 10 is stopped by the upper end portion 62 of the second planar wall portion 58 coming into contact with the interior side 18 of the keyboard structure 10 and a bottom end of the first planar wall portion 50 simultaneously coming into contact an upwardly facing ledge 68 formed in at least one of the side walls 32, 34 of the base housing 10. As readily seen from the drawings, even if the ledge 68 is omitted, the stop means would still be effective since the second end portion 62 of planar wall portion 58 would still come into contact with the interior side 18 of the keyboard 10. It is important to note that the latch means 48 on the keyboard structure 10 and the base housing 26 may be totally disengaged from one another so as to allow the keyboard structure 10 to be pivoted to the transverse access position shown in FIG. 3.

With a preferred embodiment of the tiltable keyboard structure 10 having been described, a description of its operation will now be discussed. In use, computer 12 is generally stored in the closed position and as such, the keyboard structure 10 will be in its stored/transport position as shown in FIG. 1. When keyboard structure 10 is in this position, the bottom end of the first planar wall portion 50 of the latch assembly 48 will be cooperatively engaged with the ledge 68 and the upper end portion 62 of the second planar wall portion 58 will be engaged with the interior side 18 of the keyboard structure 10 as shown in FIG. 1A. When use of the computer is desired, the lid 40 will be manually pivoted to its upright use position. The keyboard structure 10 can then be raised to its tilted use orientation as shown in FIG. 2 by manually lifting up on the keyboard structure 10 with sufficient force to disengage the interlocking detent structures 56, 64b shown in FIG. 1A and subsequently engage the keyboard structure detent 56 with the base housing detent depression 64a as shown in FIG. 2A. Alternatively, the latch means 48 may be disengaged by gently lifting up keyboard structure 10 and displacing the first planar wall portion 50 sufficiently to disengage the keyboard detent 56 from the base housing detent recess 64b.

When it is desired to store the computer, the keyboard structure 10 may be returned to its storage/transportation position by manually pressing down on the keyboard structure 10 with sufficient force to disengage the keyboard structure detent projection 56 from the base housing detent recess 64a. Again, in the alternative, the latch means 48 may be disengaged by gently pressing the keyboard structure 10 down and displacing the first planar wall portion 50. The stop means 66 will then prevent keyboard structure 10 from being pressed below the storage/transport position.

If the user desires to access the interior of computer 12 from the top, the user may lift up on keyboard structure 10 with sufficient force to disengage and separate the cooperating detent wall portions 50, 58. Once these detent wall portions are separated from one another, the user may pivot the keyboard structure 10 to its full upright access position as shown in FIG. 3. This access position provides the user with access to the motherboard 47 within the interior of the computer base housing 24. When the keyboard structure 10 is so positioned, components may be added or replaced as desired. After the desired modifications have been made, the keyboard structure 10 is manually lowered and sufficient force is applied to the keyboard structure 10 to releasably reengage the overlapping detent wall portions 50, 58 in either the tilted use position or the storage/transportation position.

The foregoing detailed description is to be clearly understood as being given by way of illustration and example only, the spirit and scope of the present invention being limited solely by the appended claims.

What is claimed is:

1. A compact portable computer, such as a laptop or notebook computer, comprising:

a base housing having a side wall, a top side with an access opening disposed therein and communicating with the interior of said base housing and an opposite front and rear side portions;

a lid housing secured to said rear side portion of said base housing for pivotal movement relative thereto between a closed storage/transport orientation in which said lid housing extends across and covers said top side with a front side of the lid housing facing and generally parallel to the top side of said base housing, and an open use position in which said front side of said lid housing is generally transverse to the top side of said base housing;

a monitor structure carried by said lid housing and having a screen portion extending along said front side thereof;

a keyboard structure secured to said top side of said base housing for pivotal movement relative thereto between (1) a storage/transport orientation in which said keyboard structure is generally parallel to said top side of said base housing and extends across said access opening, (2) a tilted use orientation in which said keyboard structure slopes forwardly and downwardly at a relatively small angle relative to said top side of said base housing, and (3) an access position in which said keyboard structure is generally transverse to said base housing;

a latch assembly having a first latch member depending from an exterior wall of said keyboard structure and a second latch member extending from said side wall of said base housing, said first latch member engageable with said second latch member for releasably holding said keyboard structure in a selectively variable one of said storage/transport and tilted use positions, said said first and second latch members being releasably disengageable from an exterior of said base housing to permit said keyboard to be pivoted to said access position to thereby expose the interior of said base housing through said access opening.

2. The computer of claim 1 further comprising stop means for preventing downward pivoting of said keyboard structure past said storage/transport orientation thereof.

3. The computer of claim 2 wherein said stop means include cooperatively abutting portion of said keyboard structure and said base housing.

4. The computer of claim 1 wherein said latch assembly includes cooperatively opposing, engageable detent structures carried by said keyboard structure and said base housing.

5. The computer of claim 4 wherein said cooperatively engageable detent structures are a plurality of cooperatively engageable detents carried by said keyboard structure and said base housing.

6. The computer of claim 1 wherein said cooperatively latch assembly on said keyboard structure and said base housing are defined generally planar portions thereof having interengageable projections and depressions.

7. The computer of claim 1 wherein the computer has a mother board located in an upper portion of the interior of said base housing and to which manual access can be achieved through said access opening in said base housing.

8. A compact portable computer, such as a laptop or notebook computer, comprising:

a base housing having a top side with an access opening disposed therein and communicating with the interior of said base housing, opposite front and rear side portions, and opposite side wall portions;

a lid housing secured to said rear side portion of said base housing for pivotal movement relative thereto between a closed storage/transport orientation in which said lid housing extends across and covers said top side with a front side of the lid housing facing and generally parallel to the top side of said base housing, and an open use position in which said front side of said lid housing is generally transverse to the top side of said base housing;

a monitor structure carried by said lid housing and having a screen portion extending along said front side thereof;

a keyboard structure having an exposed top key side portion with an interior side portion extending across said top side of said base housing, and oppositely disposed side walls depending therefrom and a front end portion, said front end portion of said keyboard structure being secured to said top side of said base housing for pivotal movement relative thereto between (1) a storage/transport orientation in which said keyboard structure is generally parallel to said top side of said base housing and extends across said access opening, (2) a tilted use orientation in which said keyboard structure slopes forwardly and downwardly at a relatively small angle relative to said top side of said base housing, and (3) an access position in which said keyboard structure is generally transverse to said base housing; and a latch assembly having a first latch member having projections depending from keyboard structure side walls and a second latch member having indentations for receiving said projections and extending upwardly from said base housing side wall portions, said projections engageable with said indentations for releasably holding said keyboard structure in a selectively variable one of said storage/transport and tilted use positions, said said projections and indentations being releasably disengageable to permit said keyboard to be pivoted to said access position to thereby expose the interior of said base housing through said access opening.

9. The computer of claim 8 further comprising stop means for preventing downward pivoting of said keyboard structure past said storage/transport orientation thereof.

10. The computer of claim wherein said stop means comprise cooperatively engageable portions of said depending keyboard structure side walls and said base housing side wall portions.

11. The computer of claim 8 wherein the computer has a mother board located in the upper portion of the interior of said base housing through which access to said mother board can be achieved through said access opening in said base housing.

12. A compact portable computer, such as a laptop or notebook computer, comprising:

a base housing having a top side with an access opening disposed therein and communicating with the interior of said base housing, opposite front and rear side portions, and opposite side wall portions;

a lid housing secured to said rear side portion of said base housing for pivotal movement relative thereto between a closed storage/transport orientation in which said lid housing extends across and covers said top side with a front side of the lid housing facing and generally parallel to the top side of said base housing, and an open use position in which said front side of said lid housing is generally transverse to the top side of said base housing;

a monitor structure carried by said lid housing and having a screen portion extending along said front side thereof;

a keyboard structure having an exposed top key side portion with an interior side portion extending across said top side of said base housing, and oppositely disposed side walls depending therefrom and a front end portion, said front end portion of said keyboard structure being secured to said top side of said base housing for pivotal movement relative thereto between (1) a storage/transport orientation in which said keyboard structure is generally parallel to said top side of said base housing and extends across said access opening, (2) a tilted use orientation in which said keyboard structure slopes forwardly and downwardly at a relatively small angle relative to said top side of said base housing, and (3) an access position in which said keyboard structure is generally transverse to said base housing; and a latch assembly member including a first generally planar member with a first end portion depending from at least one of said side walls of said keyboard structure, said first planar member having a cooperatively engageable detent therein and a second end portion, and a said second latch member having a second planar member with a first end extending upwardly from at least one of said side walls of said base housing, said second planar member having a detent therein that is cooperatively engageable with said detent in said first planar member; a second end portion that is engageable with the interior side of said top key side portion of said keyboard structure; and a notch for receiving said second end portion of said first planar member.

* * * * *